United States Patent [19]

Borkenhagen et al.

[11] Patent Number: 4,972,414
[45] Date of Patent: Nov. 20, 1990

[54] METHOD AND APPARATUS FOR DETECTING OSCILLATOR STUCK FAULTS IN A LEVEL SENSITIVE SCAN DESIGN (LSSD) SYSTEM

[75] Inventors: John M. Borkenhagen; Steven M. Douskey; Jerome M. Meyer, all of Rochester, Minn.

[73] Assignee: International Business Machines Corporation, Armonk, N.Y.

[21] Appl. No.: 435,068

[22] Filed: Nov. 13, 1989

[51] Int. Cl.$^5$ .................................. G01R 31/28
[52] U.S. Cl. ............................. 371/22.3; 324/158 R; 371/61
[58] Field of Search ...................... 371/15.1, 12.3, 61, 371/71; 324/158 R, 158 T

[56] References Cited

U.S. PATENT DOCUMENTS

| | | | |
|---|---|---|---|
| 3,761,695 | 9/1973 | Eichelberger | 235/153 AC |
| 3,783,254 | 1/1974 | Eichelberger | 235/152 |
| 3,784,907 | 1/1974 | Eichelberger | 324/57 DE |
| 4,071,902 | 1/1978 | Eichelberger et al. | 364/716 |
| 4,268,902 | 5/1981 | Berglund et al. | 364/200 |
| 4,374,361 | 2/1983 | Holden | 328/120 |
| 4,399,412 | 8/1983 | Rinaldi | 328/112 |
| 4,467,285 | 8/1984 | Rinaldi | 328/112 |
| 4,542,509 | 9/1985 | Buchanan et al. | 371/61 |
| 4,800,564 | 1/1989 | DeFazio et al. | 371/61 |
| 4,811,343 | 3/1989 | Johansson et al. | 371/15 |
| 4,864,574 | 9/1989 | Pritt | 371/61 |
| 4,896,323 | 1/1990 | Korner et al. | 371/61 |

FOREIGN PATENT DOCUMENTS

| | | |
|---|---|---|
| 125755 | 11/1967 | Fed. Rep. of Germany . |
| 55-114030 | 9/1980 | Japan . |
| 63-123216 | 5/1988 | Japan . |

OTHER PUBLICATIONS

Veneziano, P. J., "Pulse Checking Circuit", IBM Technical Disclosure Bulletin, vol. 9, No. 5, Oct. 1966, p. 473.
Curlander, P. J., "Self-Checking Oscillator Failure Detector", IBM Technical Disclosure Bulletin, vol. 19, No. 5, Oct. 1976 pp. 1608–1609.
Frappier, M. B., "Single Nand-Gate Quad Detects Loss of Pulse Stream", Electronic Design, Aug. 20, 1981, pp. 158–159.
Dutton, P. F., "Stuck at 0 or Stuck at 1 Check Circuit", IBM Technical Disclosure Bulletin, vol. 24, No. 12, May 1982, pp. 6398–6399.
Hanna, S. D. and Williams, T. W., "LSSD Testable Derived B Clock Design", IBM Technical Disclosure Bulletin, vol. 29, No. 11, Apr. 1987, p. 4893.

Primary Examiner—Reinhard J. Eisenzopf
Assistant Examiner—W. Burns
Attorney, Agent, or Firm—Mason, Kolehmainen, Rathburn & Wyss

[57] ABSTRACT

A method and apparatus for identifying stuck faults in an oscillator used for providing an oscillator input signal to an integrated circuit chip of the type conforming to a Level Sensitive Scan Design (LSSD) system and testing technique. A pair of shift register latches (SRLs) are providing in the integrated circuit chip having a logical one signal applied to a data input of the SRLs. The oscillator input signal is applied to a data clock input of a first one of the SRLs and an inverted oscillator input signal is applied to the data clock input of a second one of the SRLs. Then the scan data output (SDO) of the test SRLs is detected responsive to the applied oscillator and inverted oscillator input signals to identify a stuck fault.

12 Claims, 1 Drawing Sheet

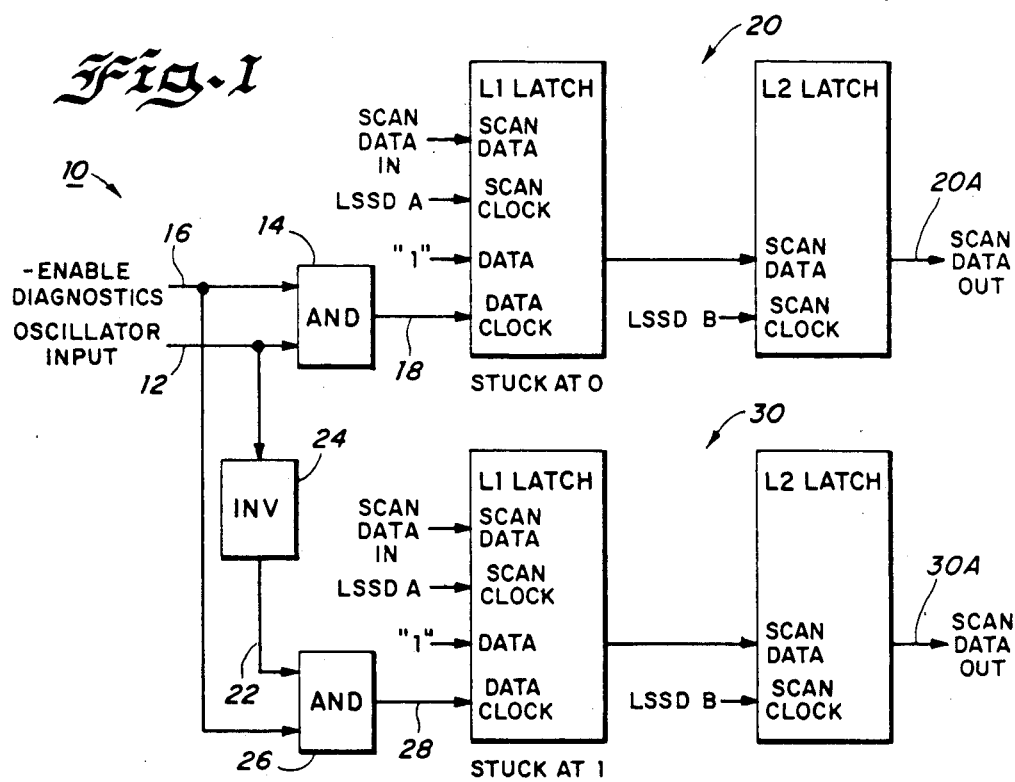
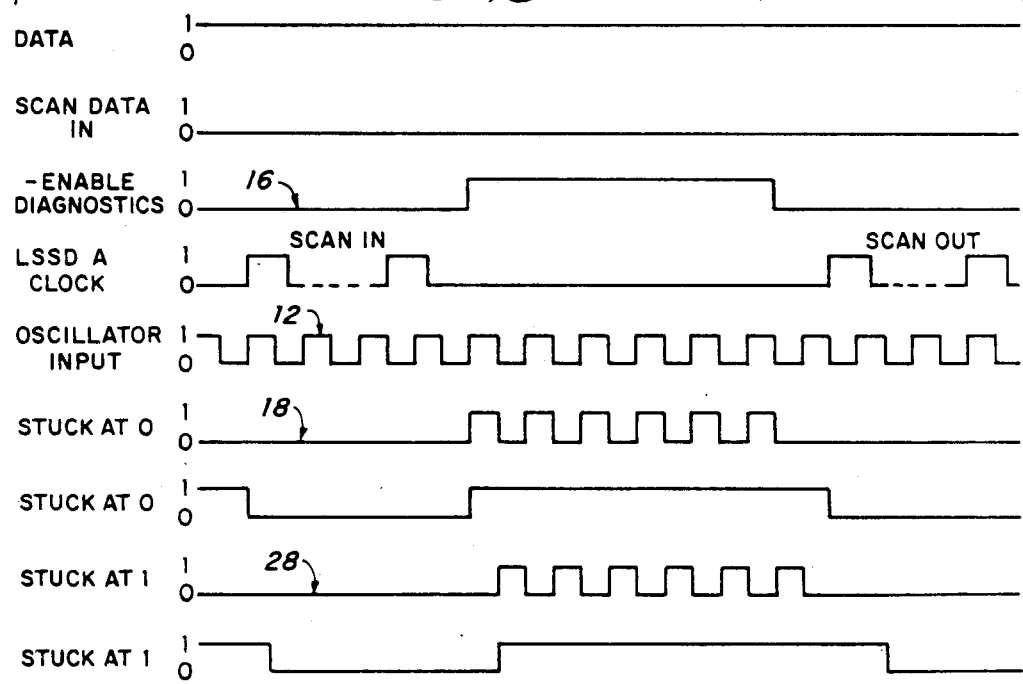

METHOD AND APPARATUS FOR DETECTING OSCILLATOR STUCK FAULTS IN A LEVEL SENSITIVE SCAN DESIGN (LSSD) SYSTEM

BACKGROUND OF THE INVENTION

1. Field of the Invention

The present invention relates to a method and apparatus for stuck fault testing an oscillator and more particularly to method and apparatus for stuck fault testing an oscillator adapted for use with a Level Sensitive Scan Design (LSSD) system and testing technique of the type disclosed and defined in U.S. Pat. Nos. 3,783,254, 3,761,695, 3,784,907 and 4,268,903 and of common assignee.

2. Description of the Prior Art

Due to the complexity and the extremely great number of circuit functions contained on a single large scale integrated (LSI) device or chip, the LSSD system and testing technique have been widely used. An oscillator is susceptible to stuck faults or permanent static bit failures where a clock oscillator signal is fixed at either a logical one "1" or a logical zero "0."

U.S. Pat. No. 4,268,903 issued May 19, 1981 and of common assignee generally discloses the LSSD system and testing technique and a computer system including a maintenance interface compatible with LSSD design for synchronizing the operation of a service processor and a central pro- cessing unit. The disclosure of U.S. Pat. No. 4,268,903 is incorporated herein by reference.

Various testing techniques have been employed to identify stuck faults in oscillators. Many testing techniques utilize a separate reference pulse which requires additional logic to generate and that is also subject to failure. Examples of such testing techniques are disclosed in U.S. Pat. Nos. 4,374,361, 4,399,412, 4,467,285 and a publication entitled "PULSE CHECKING CIRCUIT" by P. J Veneziano, IBM Technical Disclosure Bulletin, Vol. 9, No. Oct. 5, 1966, p. 473. Other significant disadvantages of the above and many of the known testing methods are that LSSD compatibility is not provided and a special reporting logic is required.

Many testing methods that are compatible with LSSD testing techniques disable the system oscillator during diagnostic subroutines so that an oscillator stuck fault cannot be identified.

For example, U.S. Pat. No. 4,542,509 discloses a method and apparatus for fault testing a clock distribution network that includes a plurality of clock signal lines for distributing a clock signal from a system oscillator. The fault testing apparatus includes a test latch for storing either a logical value one "1" or a logical value "0" and a decoder for connecting any one of the clock signal lines to the test latch. During the fault testing method the system oscillator is effectively disconnected from the clock distribution network under test.

A need exists for a method and apparatus for detecting oscillator stuck faults that facilitates error reporting with the LSSD scan function and that does not require additional input/output pins or other special changes to individual chips.

SUMMARY OF THE INVENTION

Important objects of the present invention are to provide an improved method and apparatus for fault testing an oscillator; to provide such a fault testing method and apparatus adapted for use with a Level Sensitive Scan Design (LSSD) system and testing technique; to provide such a fault testing method and apparatus that facilitates failure reporting utilizing a LSSD scan function; to provide such a fault testing method and apparatus that does not require special signals from or special changes in other components in the system; and to provide such a fault testing method and apparatus that facilitates efficient and reliable error detecting operations.

In brief, the objects and advantages of the present invention are achieved by a method and apparatus for identifying stuck faults in an oscillator used for providing an oscillator input signal to an integrated circuit chip of the type conforming to a Level Sensitive Scan Design (LSSD) system and testing technique. A pair of test shift register latches (SRLs) are provided in the integrated circuit chip. A logical one signal is applied to a functional data input of the test SRLs. The oscillator input signal is applied to a data clock input of a first one of the test SRLs and an inverted oscillator input signal is applied to the data clock input of a second one of the test SRLs. Then the scan data output (SDO) of the test SRLs is detected responsive to the applied oscillator and inverted oscillator input signals to identify a stuck fault in the oscillator.

BRIEF DESCRIPTION OF THE DRAWINGS

The present invention together with the above and other objects and advantages may best be understood from the following detailed description of the embodiment of the invention illustrated in the drawings, wherein:

FIG. 1 is a block diagram of a testing system which may be employed in carrying out the testing method of the invention; and FIG. 2 is a timing diagram illustrating the control signals which may be employed in carrying out the testing method of the invention.

DETAILED DESCRIPTION OF THE PREFERRED EMBODIMENT

Referring now to the drawings, in FIG. 1 there is illustrated a block diagram representation of a stuck fault testing logic system according to the invention generally designated by the reference numeral 10. Fault testing logic system 10 advantageously is implemented as a part of an integrated circuit chip for providing stuck fault diagnostics of an oscillator providing a clock oscillator signal to the chip.

A clock oscillator signal indicated at a line 12 labelled OSCILLATOR INPUT is applied to a first input of a two-input AND gate 14 of the testing logic system 10. An inverted enable diagnostics signal indicated at a line 16 labelled −ENABLE DIAGNOSTICS is applied to the other input of AND gate 14. The enable diagnostics signal is activated high at least with each initial program load (IPL) and during LSSD scan testing functions. Otherwise the enable diagnostics signal is deactivated low.

Referring also to FIG. 2, the −ENABLE DIAGNOSTICS signal 16 provides a logical 0 signal during LSSD scan testing functions and a logical 1 signal during normal data functions. The output of AND gate 14 indicated at a line 18 is applied to a data clock input of a first test shift register latch (SRL) labelled STUCK AT 0 and designated by the reference numeral 20.

An inverted clock oscillator signal indicated at a line 22 is generated at the output of an INVERTER gate 24.

The inverted clock oscillator signal is applied to a second two-input AND gate 26. The −ENABLE DIAGNOSTICS signal 16 is applied to the other input of AND gate 26. The output of AND gate 26 indicated at a line 28 is applied to a data clock input of a second test SRL labelled STUCK AT 1 and designated by the reference numeral 30.

Each of the STUCK AT 0 and STUCK AT 1 test SRLs 20 and 30 are implemented by a typical shift register latch used as a single storage element with the integrated circuit LSSD chip including the testing logic system 10. Each SRL 20 and 30 consists of a pair of polarity hold latches L1 and L2 (type D) with the output of the first L1 latch applied to an input of the second L2 latch. Typically the L1 latch is used as a functional storage element, while the L2 latch is used to improve the effectiveness of chip testing.

LSSD requires that all of the SRLs on the entire chip are connected together into a shift register or scan ring by connecting a scan data output (SDO) of each L2 latch to another scan data input (SDI) of a L1 latch to allow patterns to be shifted or scanned into and out of all latches in the design. An A clock input is used to clock data from the SDI into the L1 latch. Functional data at an input DATA is the normal functional data input with a data clock used to load data from this input. A B clock input is used to clock data from the L1 latch into the L2 latch of the LSSD scan ring. The LSSD A scan clock is illustrated and the LSSD B scan clock is not shown in FIG. 2. During LSSD scan functions first the B clock is activated to copy the L1 latch data to the L2 latch, then the A clock is activated to load the previous L2 latch data at the L1 latch.

During an initial LSSD scan function, logical zeroes are scanned into all the SRLs on the integrated circuit LSSD chip including the SRLs 20 and 30 of the testing logic system 10 before the chip is placed in functional mode. As shown in FIGS. 1 and 2, a logical zero is applied to the SD1 and a logical one is applied to the L1 latch data input of the test SRLs 20 and 30. The oscillator input signal 12 and the inverted oscillator input signal 22 AVE ANDed with the −ENABLE DIAGNOSTICS signal 16 by gates 14 and 26, respectively, to isolate the oscillator and the inverted oscillator input signals 12 and 22 from the data clock of the SRLs 20 and 30 during the LSSD scan functions. The −ENABLE DIAGNOSTICS signal 16 is low or logical zero during the initial SCAN IN function so that the data clock signals 18 and 28 are logical zero. The SDO of the test SRLs 20 and 30 indicated respectively at a line 20A and 30A are set at logical zero.

FIG. 2 illustrates timing waveforms corresponding to a normal oscillator input signal 12 provided by the oscillator being tested. After the initial SCAN IN function the −ENABLE DIAGNOSTICS signal 16 is activated high or to logical one so that the data clock signals 18 and 28 applied to the SRLs 20 and 30 correspond to the oscillator and the inverted oscillator input signals 12 and 22, respectively. Unless the oscillator under test has either a stuck at zero fault or stuck at one fault, the logical one SDI is loaded to the L1 latch of the test SRLs 20 and 30 responsive to an active high data clock signal 18, 28, respectively.

Otherwise with a stuck at zero OSCILLATOR INPUT signal 12, The L1 latch of the STUCK AT 1 SRL 30 is loaded with a logical one responsive to the resulting active high data clock signal 28 while the L1 latch of the STUCK AT 0 SRL 20 is maintained at a logical zero. With a stuck at one OSCILLATOR INPUT signal 12, the STUCK AT 1 SRL 30 L1 latch data is maintained at a logical zero and the L1 latch of the STUCK AT 0 SRL 20 is loaded at a logical one responsive to the resulting active high data clock signal 18.

The LSSD scan function is used for reporting oscillator stuck faults. As shown in FIG. 2, the −ENABLE DIAGNOSTICS signal 16 returns low or logical zero so that the resulting deactivated low data clock signal 18, 28 is applied to the SRLs 20, 30, respectively. Scanning begins as indicated at SCAN OUT. In response to a LSSD B scan clock pulse the L1 latch data that was loaded responsive to the previous data clock signals 18 and 28 is copied to the L2 latch for the test SRLs 20 and 30. When the oscillator is providing the normal oscillator input signal 12, a logical one is copied to the L2 latch of both test SRLs 20 and 30. Otherwise with either a stuck at one or a stuck at zero fault, a logical zero is copied to the the L2 latch of one of the test SRLs 20 or 30. The L2 latch data is scanned from the STUCK AT 0 and STUCK AT 1 test SRLs 20, 30 via a chip SDO. Each of the test SRLs 20, 30 are provided at a predefined position relative to the chip SDO in order to locate the stuck fault data.

Fault testing logic system 10 can be implemented with logic circuitry as illustrated in FIG. 1 for carrying out the testing method of the invention; however, it should be understood that various other logic circuitry could be used.

While the invention has been described with reference to details of the illustrated embodiment, these details are not intended to limit the scope of the invention as defined in the appended claims.

We claim:

1. A method for identifying stuck faults in an oscillator used for providing an oscillator input signal to an integrated circuit chip of the type conforming to a Level Sensitive Scan Design (LSSD) system and testing technique, said method comprising the steps of:
   providing a pair of test shift register latches (SRLs) in the integrated circuit chip;
   applying a logical one to a data input of said test SRLs;
   applying the oscillator input signal to a data clock input of a first one of said test SRLs and applying an inverted oscillator input signal to said data clock input of a second one of said test SRLs; and
   detecting the scan data output (SDO) of said test SRLs responsive to said applied oscillator and inverted oscillator input signals to identify a stuck fault in the oscillator.

2. A method as recited in claim 1 wherein each said test SRLs are located at a predefined position relative to a SDO of the integrated circuit chip.

3. A method as recited in claim 1 wherein said step of detecting the scan data output (SDO) of said SRLs responsive to said applied oscillator and inverted oscillator input signals to identify a stuck fault in the oscillator includes the steps of:
   isolating said oscillator input signal from said data clock input of said first one of said test SRLs and said inverted oscillator input signal from said data clock input of said second one of said test SRLs; and
   sequentially applying a first LSSD B scan clock signal and a second LSSD A scan clock signal.

4. A method as recited in claim 3 further including the step of:
   sequentially sampling a SDO of the integrated circuit chip for detecting the scan data output (SDO) of said test SRLs.

5. A method as recited in claim 3 wherein said step of isolating said oscillator input signal from said data clock input of said first one of said test SRLs and said inverted oscillator input signal from said data clock input of said second one of said test SRLs includes the steps of:
   applying said oscillator input signal to an input of a first AND gate;
   applying said inverted oscillator input signal to an input of a second AND gate;
   applying an active low LSSD scan enable signal to the other input of said first and second AND gates;
   applying an output of said first AND gate to said first one of said test SRLs; and
   applying an output of said second AND gate to said second one of said test SRLs.

6. A method as recited in claim 1 wherein a detected logical one value for the scan data output (SDO) of both said test SRLs indicates no stuck fault in the oscillator.

7. A method as recited in claim 1 wherein a detected logical zero value for the scan data output, (SDO) of said first test SRL indicates a stuck at zero fault in the oscillator.

8. A method as recited in claim 1 wherein a detected logical zero value for the scan data output (SDO) of said second test SRL indicates stuck at one fault in the oscillator.

9. Apparatus for identifying stuck faults in an oscillator used for providing an oscillator input signal to an integrated circuit chip of the type conforming to a Level Sensitive Scan Design (LSSD) system and testing technique, said apparatus comprising:
   a pair of test shift register latches (SRLs) included in the integrated circuit chip;
   means for applying a logical one to a data input of said test SRLs;
   means for applying the oscillator input signal to a data clock input of a first one of said test SRLs;
   means for applying an inverted oscillator input signal to said data clock input of a second one of said test SRLs; and
   means for detecting the scan data output (SDO) of said test SRLs responsive to said applied oscillator and inverted oscillator input signals to identify a stuck fault in the oscillator.

10. Apparatus as recited in claim 9 wherein said means for applying the oscillator input signal to a data clock input of a first one of said test SRLs and said means for applying an inverted oscillator input signal to said data clock input of a second one of said test SRLs includes:
    a first AND gate, said oscillator input signal coupled to an input of said first AND gate;
    a second AND gate, said inverted oscillator input signal to an input of said second AND gate;
    means for coupling an active low LSSD scan enable signal to another input of said first and second AND gates;
    means coupling an output of said first AND gate to said first one of said test SRLs; and
    means coupling an output of said second AND gate to said second one of said test SRLs.

11. Apparatus as recited in claim 10 wherein said means for detecting the scan data output (SDO) of said test SRLs comprise LSSD scanning means responsive to said active low LSSD scan enable signal for sequentially sampling a SDO of the integrated circuit chip.

12. Apparatus as recited in claim 11 wherein said sampling means is responsive to a first LSSD B scan clock signal and a sequential second LSSD A scan clock signal.

* * * * *